June 2, 1953  J. D. RIESER  2,640,367
UNIMOUNT DRIVE POWER TRANSMISSION UNIT
Filed July 10, 1947  4 Sheets-Sheet 1
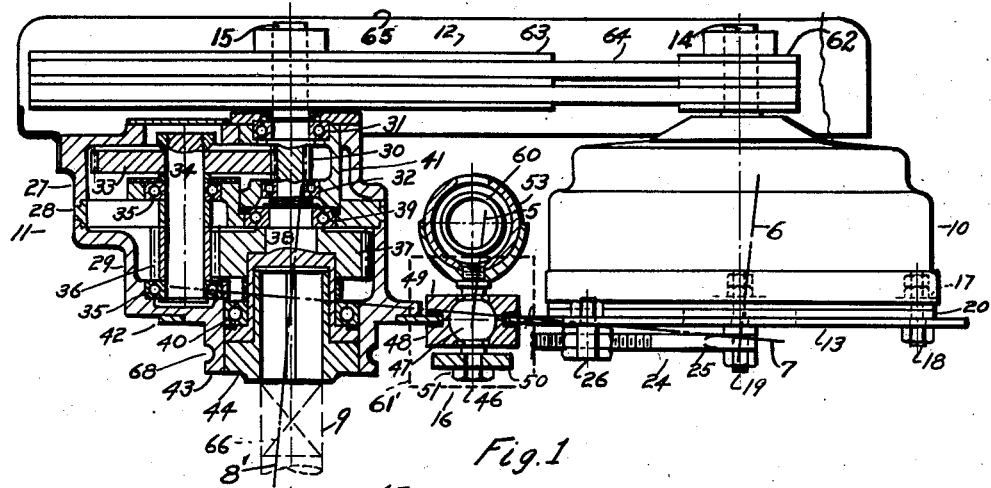
Fig. 1
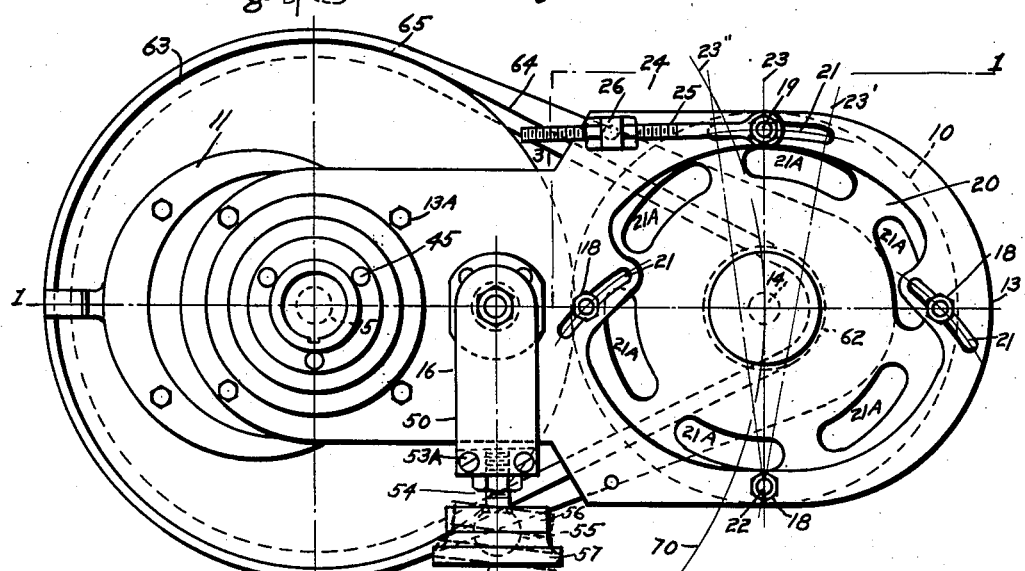
Fig. 2
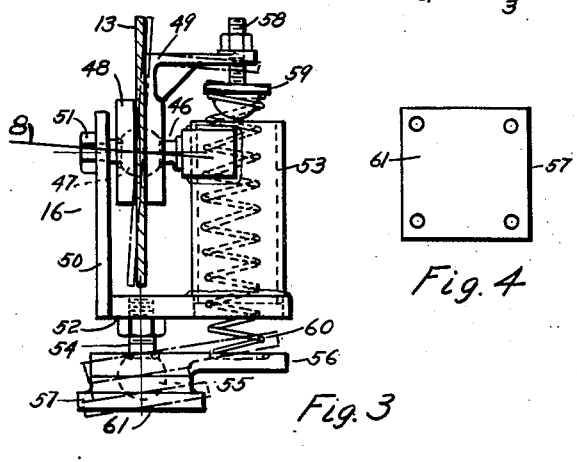
Fig. 3
Fig. 4
INVENTOR.
John D. Rieser.
BY
ATTORNEY

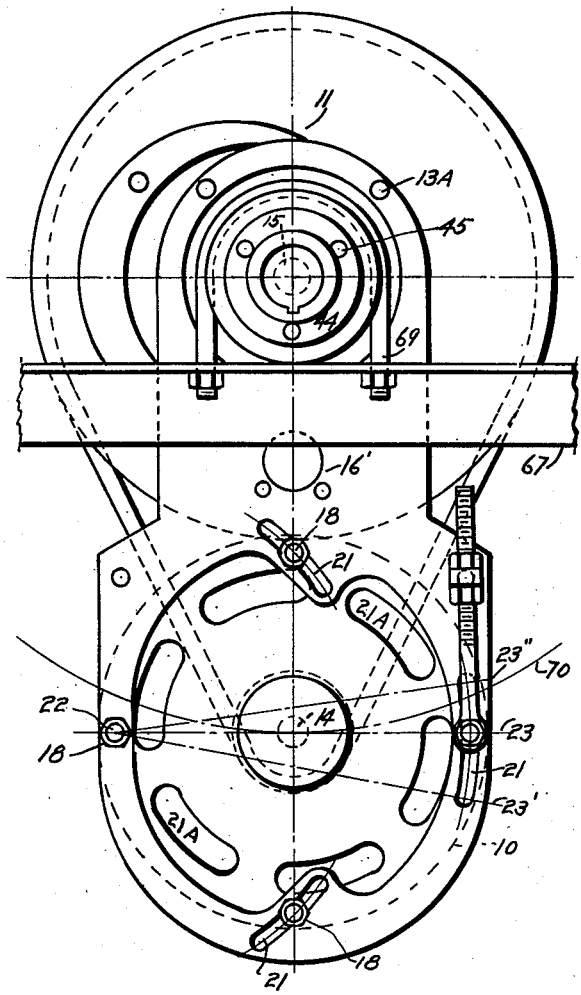
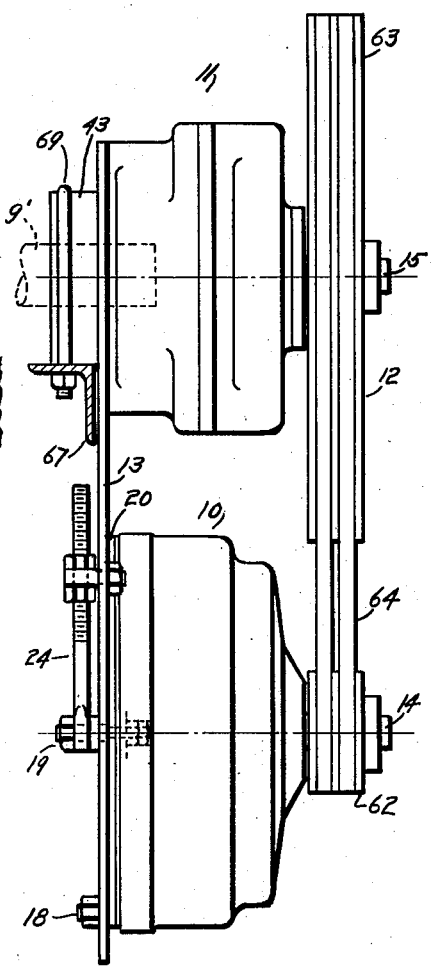
Fig. 5
Fig. 6

June 2, 1953   J. D. RIESER   2,640,367
UNIMOUNT DRIVE POWER TRANSMISSION UNIT
Filed July 10, 1947   4 Sheets-Sheet 3
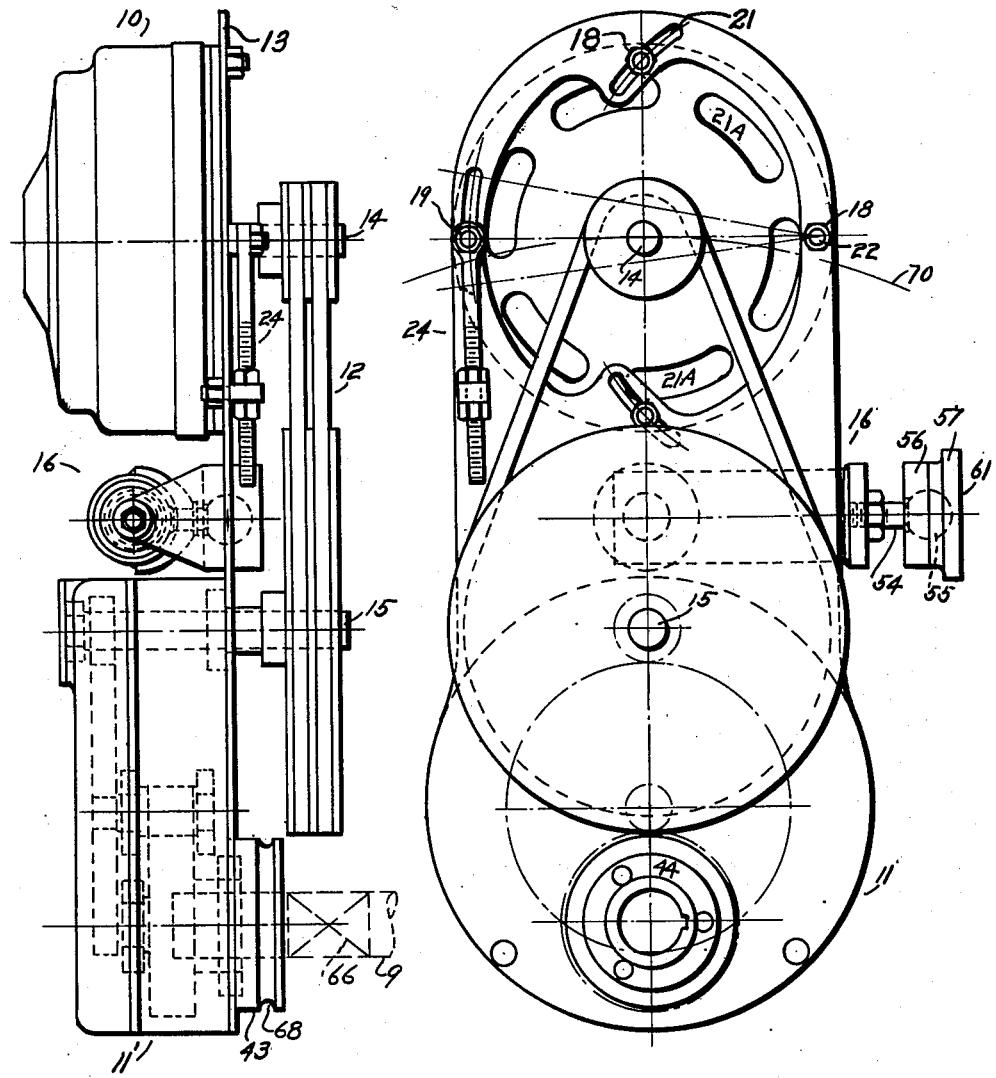
Fig. 8   Fig. 7
INVENTOR.
John D. Rieser
ATTORNEY June 2, 1953     J. D. RIESER     2,640,367
UNIMOUNT DRIVE POWER TRANSMISSION UNIT
Filed July 10, 1947     4 Sheets-Sheet 4

INVENTOR.
John D. Rieser
ATTORNEY

Patented June 2, 1953

2,640,367

UNITED STATES PATENT OFFICE 2,640,367

UNIMOUNT DRIVE POWER TRANSMISSION UNIT

John D. Rieser, San Francisco, Calif.

Application July 10, 1947, Serial No. 760,044

13 Claims. (Cl. 74—242.13)

1

The invention relates to power transmission drives and more particularly, to power transmissions comprised of a driving electric motor and speed change mechanism arrangement, co-relatively supported, and provided with self-alignable support means, forming, a unimount drive unit, adapted to be mounted about portion of a drive shaft of the driven machinery.

Since most driving electric motors operate at relatively high speeds, and these speeds are considered as standard, and while the speed characteristics of the drive shaft of the machinery to be driven are often low speed or of a different speed from that of the driving motor, speed change devices are required between the driving electric motor and the machinery drive shaft, the speed change device possessing the requisite drive ratio. In many transmission drives, the speed of the driven shafts are considerably less than that of the driving motors, and to span the range of speed between the driving electric motor and the requisite speed of the driven shaft, the familiar power transmission drives, such as gearmotors or gear reducer units are sometimes applied, with or without added change speed drive mechanism.

However, when a gear unit or the like is utilized, with its power takeoff shaft directly connected rigidly to the drive shaft, provision need be made against any possible misalignment between the two shafts. Even though the utmost care is used, an original alignment can be nullified by later events, for foundations settle, vibration is continually present, shafts and their journals wear, and changes of temperature create continuous expansion and contraction that can rarely be averted. Diligent care may ease a portion of these factors, and to overcome these undesirable characteristics, practice dictates the utilization of a flexible drive coupling between the two shafts for this class of drive.

In the application of such power transmission drive units, the consequent requisite of providing both parallel and angular alignment between the shafts of the two machines together with that of the base anchorage alignment at the foundation is recognized, even though a flexible drive coupling is employed to connect the power output shaft of the gearmotor unit and the drive shaft of the driven machinery. The misalignment permissible when employing the familiar power transmitting flexible couplings to connect the shafts of the two machines, is definitely limited within narrow limits, and this alignment relationship need be maintained in substantial manner within these limits for protection against undue abuse and wear, a fact well known to those skilled in this art.

In a drive of this character, employing a gear-

2 motor unit or the like, together with a flexible drive coupling connecting the two shafts, the following remarks refer to but a portion of the problems encountered. Such a drive, in addition to the gearmotor unit, entails the furnishing of a suitable flexible drive coupling, the machining necessary at each coupling half to match the two shafts, the assembly cost of installing both halves separately onto the two shafts, the cost of providing a substantial foundation of ample size consistent with the base structure of the gearmotor unit, plus the cost of providing and maintaining the necessary alignment relationship within the limits of the flexible coupling. In such applications, compactness is sacrificed by the spreading out effect of the drive in lengthwise direction.

Other typical drives that are often encountered, are of the type wherein the speed of the gearmotor unit power takeoff shaft is different from that of the driven shaft. Drives of this form require that a belt or chain drive having suitable ratio of drive, be used to couple the two shafts. In such drives, the same problems are encountered as those hereinabove described, except that the alignment problem need not be as precise, and in this event the belt or chain drive mechanism replaces the flexible drive coupling.

In the case of drives, having a geared speed change device without a driving motor, but constructed to be attachable directly about the drive shaft along with a belt or chain drive connecting the geared speed change device to a driving motor, the same problems are encountered as those hereinabove discussed. The alignment problem being between the geared speed change device and the driving motor and, the foundation and anchorage requirement need be sufficient to accommodate both the driving motor and the speed change device. Also in the application of drives of this form, other problems are produced, one of which is that the pulley or sprocket for the belt or chain adjacent to the geared speed change device, creates a spread out effect on the driven shaft, and consequently, the overhung leverage times the driving pull of the belt or chain, plus the weight of the device, produces a bending moment that need be qualified for in addition to that of the load stresses in the size of the driven shaft and its bearings.

The speed change power transmission drive units of the present invention obviates the above discussed and other difficulties. The unit mounts a standard driving electric motor and a speed change mechanism in manner to form a complete motorized drive that may be mounted directly on a driven shaft of the machinery to be driven and, its dimension need not be greater than that of the applied motor. The feature of a simple primary drive between the driving motor and other speed change device is such, that its utility virtually averts bending stresses of the driven shaft. The primary drive is a readily obtainable inexpensive standard transmission gearing, adaptable for a wide range of speeds. The attained feature of simple direct mountable characteristics obviates the necessity of flexible coupling and necessity of alignment of the supportage is advantageously averted.

An object of the present invention is to provide an improved and simplified speed change power transmission unit.

Another object of the present invention is to provide facility in the application of the speed change power transmission unit consisting of a driving electric motor and speed change mechanism arrangement, correlatively supported, and forming a unit mountable directly about a portion of a driven shaft of the machinery.

Another object of the present invention is to provide in the preceding speed change power transmission unit a support having a base structure for anchorage to a foundation, and so disposed as to virtually avert support of the unit by the driven shaft connection.

Another object of the present invention is to provide in the preceding speed change power transmission and the support with a base structure for fixed anchorage to a foundation, a support having universal joint characteristics whereby the parallel and/or angular alignment of the driven shaft need not coincide with corresponding alignment of the fixed connection between the base structure and the foundation.

Another object of the present invention is to provide facility in the application of speed change power transmission drive units comprising a driving electric motor and range of desired belt or chain drives from the power output shaft of the motor to the input shaft of a speed change device, the motor and the speed change device together with a desired belt or chain drive being correlatively supported, to form a unit that is mountable directly about a driven shaft of the driven machinery.

Another object of the present invention is to provide in the preceding speed change power transmission unit, a feature whereby the distance between the center of the motor power output shaft and the center of the power input shaft of the speed change device is adjustable to accommodate various drives desired.

Another object of the present invention is to provide in the preceding speed change power transmission drive units, particularly as to the combination of the support and mountability of the unit directly about a driven shaft of the driven machinery, being practically compensated for independently of the driven shaft, the overhung situation about the driven shaft of the unit and/or the chain or belt driving pull.

Another object of the present invention is to provide in the foregoing speed change power transmission unit, having the changeability of the center distance of the primary drive, motor ventilation means for the driving electric motor and positioned in the mounting structure.

Another object of the present invention is to provide a saving in cost together with compactness in the application of speed change power transmission driving devices.

This invention possesses other advantages and has other objects which may be made more easily apparent from a consideration of several embodiments of the invention. For this purpose there are shown several forms in the drawings accompanying and forming a part of the present specification. These forms will now be described in detail to illustrate the general principles of the invention, but it is to be understood that this detailed description is not to be taken in a limiting sense as the same are susceptible of modification without departing from the spirit or scope of the invention which is broadly set forth in the appended claims.

In the accompanying drawings:

Figure 1 is a plan view partly in section, taken on the line 1—1 of Figure 2.

Figure 2 is an elevation taken on the power take-off side and operatively arranged for a horizontal drive and utilizing the self-aligning support with a counterpoise.

Figure 3 is an elevation section showing the self-aligning support with a counterpoise, taken on the line 3—3 of Figure 2.

Figure 4 is a bottom plan view of the self-aligning support base.

Figure 5 is an elevation similar to that of Figure 2, but operatively arranged for a vertical drive and utilizing the universal mounting hub for support.

Figure 6 is a side elevation of Figure 5.

Figure 7 is an elevation taken on the power takeoff side similar to that of Figure 2, but with the primary drive being located on the power takeoff side.

Figure 8 is a side elevation of Figure 7.

Figure 10:
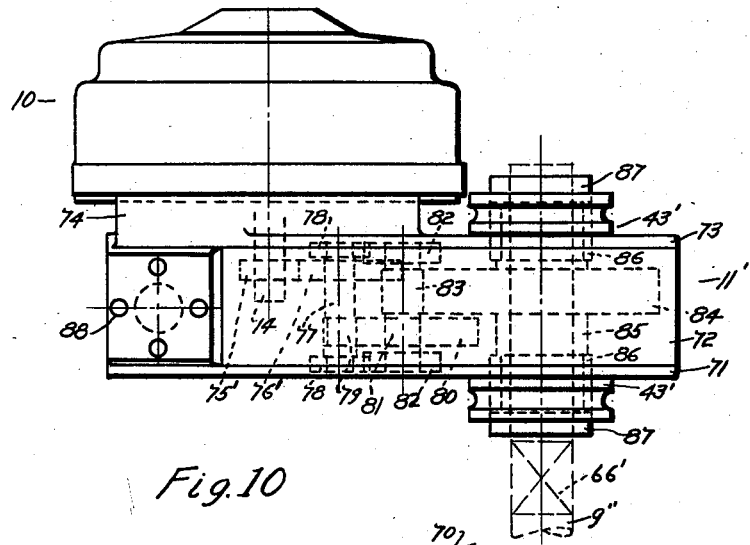
Figure 10 is a side elevation of Figure 9.

In conformity with the objects of this invention, to provide speed change power transmission drive units, hereinafter referred to as unimount drive units, and referring to Figure 1, the unit is shown as generally comprising a driving electric motor 10, a speed change device 11, a primary drive 12, which affords a drive connection between the motor 10, the speed change device 11, and the mounting plate 13 which affords unity and supportability of the motor 10 and the speed change device 11 together with the primary drive 12. The unimount drive unit shown in the Figure 1, is indicated as being mounted about a driven shaft 9 of the driven machinery. This shaft 9, together with one of its support bearings 66 is indicated in conventional manner by dash lines.

Referring to Figures 1 and 2, the motor 10 is attached to the mounting plate 13 (as hereinafter described), the change speed device is, in this instance, a double reduction gear unit and is also attached to the mounting plate 13 (as hereinafter described), and the primary drive 12 is an ordinary V belt reduction drive between the driving electric motor 10 and the change speed device 11 and is supported and attached about the respective shafts. The distance therebetween the motor output shaft 14 and the change speed device input shaft 15 is adjustable (as hereinafter described) and the drive angularity is in this illustration considered as horizontal. The motor 10 is disposed a distance from the change speed device 11 and therebetween at a desired position is located a self-aligning support (hereinafter described) indicated generally by the numeral 16, which is joined to the mounting plate 13 (as hereinafter described). Thus, as appears in Figures 1 and 2, the unimount drive unit is mounted about the driven shaft 9, and is virtually supported by the self-aligning support 16, (as is hereinafter described). The base indicated by the numeral 61, Figure 2, is to be considered as rigidly attached to a fixed structure or foundation.

The motor 10 comprises a readily procurable motor with provision for flange mounting and driving its power output shaft extended as desired from either end, therefore its detail structure is not here described. In this instance the power output shaft 14 extension is at the opposite end to that of the mounting flange which is indicated by the numeral 17 (and a fragment being shown by the broken lines). The motor flange has mounting bolt holes for the studs or belts 18 and 19. Between the motor flange and the mounting plate 13 is an adaptor plate 20, which has bolt holes and spaces to match the mounting bolt holes in the motor mounting flange. The adaptor plate is also provided with openings 21A, which communicate with openings in the motor structure to provide interior motor ventilation. This portion of the mounting plate 13 is provided with bolt holes spaced to match the mounting bolt holes in the motor flange or the mounting holes in the adaptor plate, a portion of these holes being indicated by the numeral 21 and are of slotted configuration, and other portions indicated by the numeral 22 are of size comparable to that of the body size of the stud or bolt. The hole 22 together with the bolt or stud 18, forms a pivot about which the spacing between the shafts 14 and 15 is adjustable (as is hereinafter described). In addition to the holes 21 and 22, the mounting plate 13 is provided with a suitable air passage that affords internal motor ventilation throughout the range of the adjustability of the to be described variation of the center distance between motor output shaft and the speed change device input shaft. The studs or bolts 18 and 19, assembled through the respective holes provided in the motor mounting flange, adaptor plate and the mounting plate affords anchorage for the motor together with the adaptor plate to the mounting plate in the desired adjusted position. Referring to Figure 2, the hole 22 in the mounting plate 13 is of a size similar to that of the bolt or stud 18, and the stud 18 forms a pivot about which the adaptor plate 20 and the motor 10 may be actuated toward or away from the change speed device. Thus, were the nuts loosened at the studs or bolts 18 and 19, the line 23 representing the vertical center, can be moved either to the position indicated by the line 23' or 23", or any intermediate point and thereby effect a change in the distance between the motor power output shaft and the change speed device input shaft. The takeup means generally indicated by the numeral 24, provides simple micrometer adjusting means, and it also serves as a means for securing an adjustment. The takeup means 24, consists of an eye bolt 25 equipped with two nuts and an anchor stud 26 having a hole therethrough. The anchor stud is fastened to the mounting plate in a desired position and the shank of the eye bolt is passed through the hole in the anchor stud with a nut on each side thereof, and its other end encircles the mounting stud 19. When utilizing the takeup means 24, one of the nuts about the eye bolt is screwed in one direction while the other nut is secrewed in the opposite direction, thereby effecting a change in the location of the motor shaft about the pivot stud 18; the slotted holes 21 permitting the adjustment.

Having completed an adpustment, the tightening of the nuts at studs 18, 19 and 25 effects the anchorage of an adjustment. For any given adjustment the ventilation openings provided afford an air passage for the internal motor ventilation.

Referring to the Figure 1, the change speed device 11 in this instance, includes a gear housing that is formed of three parts and they form together with other detail parts an oil tight enclosure for a desired gearing. One of the parts of this housing is the forward section 27; the second part is a midsection 28 and the third part is a base section 29. These are all fitted and fastened together including the bearing adaptor 41, in an ordinary manner to form a single unit. The fastenings are not shown. The base section 29, has a base flange 42 for mounting the change speed device 11 to the mounting plate 13 by the screws or bolts 13A (see Figure 2), and an extension of this base flange forms universal mounting hub 43, (its utility is hereinafter described). A portion of the power input shaft 15 shown within the gear housing is provided with a pinion gear 30 affixed thereto. This power input shaft is suitably journaled in the bearings 31 and 32. The bearing 31 together with the input shaft 15, are anchored in the usual manner to avert endwise movement. In mesh with the pinion gear 30, is a gear 33 mounted on shaft 34. Shaft 34 is suitably journaled in the two bearings 35 proximate the opposite ends thereof. A slow speed pinion gear 36 is mounted on shaft 34 adjacent to one of the bearings 35, and meshes with a slow speed gear 37 mounted on the power takeoff 38. The power takeoff is suitably journaled in bearings 39 and 40, and of these two bearings, the bearing 39 together with the power takeoff 38 are anchored in the usual manner to avert endwise movement. In this instance, the power takeoff has an enlarged section which is bored and flanged to receive the bushing 44, and the anchorage of the bushing to the power take off flange is by means of the screws 45 (see Figure 2). The bore and key seating of the bushing conforms to the size of the driven drive shaft 9. This bushing may be provided with a setscrew, if desired, to anchor the power takeoff to the shaft 9 (the setscrew is not shown). The mounting plate supports both the motor and the change speed device, of which the gear housing forms a part and supports the bearings about the shafts. The usual driving connections are provided between the shafts and the gearing. In the situation where speeds are satisfied without speed change gearing, the power input shaft and the power takeoff of the speed change device is of single form, suitably journaled, or the gear housing may be modified to accommodate single reduction gearing.

The self-aligning support 16 is a non-complex structure, being formed of a stud 46, having a spherical portion 47 provided with shank portions. The spherical portion is inclosed by caps 48 and 49 having interior surfaces bearing upon the spherical portion to form a ball type joint. A portion of these caps are butted together in a hole provided in the mounting plate 13 (see Figure 1), and the caps are clamped together by bolts or screws (not shown) in a manner to permit rotation therebetween and correlative movement of the spherical portion 47 of the stud 46. The caps 48 and 49 being fastened together through the mounting plate becomes a fixed portion of the mounting plate, while the shanks of the stud 46 which extend through an enlarged hole in the side of each of the caps is free to oscillate or rotate with respect to the mounting plate, but is restrained from endwise movement; or reversely, the mounting plate is free to oscillate or rotate about the spherical portion 47. One end of the stud 46 is shouldered to receive a bar 50 and one end of this bar is clamped to the stud by the nut 51, to the other end of the bar is attached a cross bar 52 (see Figure 3) the attachment between the bar 50 and the cross bar 52 is by the screws 53A (see Figure 2). The opposite end of the stud 46 is attached to a cylinder 53 of the counterpoise or reaction device, and this cylinder extends in the same direction as that of the bar 50 and is attached to the cross bar. In this instance, the cross bar is provided with a hole in line with the cylinder. The cap 49 has an extension reaching over the cylinder in same general direction as that of the cross bar. In line with the spherical portion 47, is a second stud 54 having a spherical end portion 55 similar to that of the spherical portion 47. About this spherical end portion, is a cap 56 and a base cap 57 having interior surfaces inclosing the spherical end portion 55 and forms a ball type joint. The cap 56 and the base cap 57 are butted and fastened together by bolts or screws (not shown) in a manner to permit rotation of the spherical end portion of the stud 54 within a portion of the cap and the base cap. The cap 56 has an enlarged hole in its side to afford passage for the stud 54. Thus, when the cap 56 and the base cap 57 have been clamped and fastened together, the stud 54 is free to oscillate or rotate with respect to the cap or the base cap; or reversely, the joined cap and base cap is free to oscillate or rotate about the spherical end of the stud. The shank of the stud 54 and the cross bar are provided with means for attaching same together as indicated.

The extension of the cap 49 is fitted with a setscrew and a lock nut 58 (see Figure 3), and the end of this setscrew bears against a washer 59. In this instance the cap 56 has an extension that extends out and beneath cylinder 53, forming a shelf for the counterpoise spring 60. The counterpoise spring extends from this shelf to the washer 59, and for the mounting indicated, the counterpoise spring is a compression spring. Thus, in the application of the unimount drive unit hereinafter described, the adjustment of the setscrew 58 toward or away from the counterpoise spring will regulate the spring force. The longitudinal axis of the counterpoise spring passing through the cylinder and the end of the cross bar, may be in the form of an arc, as there is ample clearance between the outside diameter of the counterpoise spring and the inside diameter of the cylinder.

In the application of the unimount drive unit, as shown in Figure 1, and assuming that the base 61, of the base cap 57 is attached to a fixed structure, the motor 10 and the change speed device 11 together with the primary drive 12 are mounted on one side of the mounting plate 13. The ball type joint (heretofore described) of the self-aligning support 16 is located at the mid-thickness of the mounting plate, and consequently the overhung weight effects a turning force about the ball type joint, which is compensated for by the regulated force of the counterpoise spring 60, for in this example, the fixed foundation affords support for one end of the spring that bears upon the extension of the cap 56 and at the other end the force of the spring is resisted by the extension of the cap 49. Thus, the overhung turning force is balanced by an adjustable resilient force. In addition the self-aligning support 16 affords support for the unimount drive units in such a manner whereby the machinery drive shaft is virtually relieved of the overhung situation of the unimount drive unit mounted directly about the driven shaft. Further, the self-aligning support affords universal flexibility, that permits of misalignment, both parallel and angular, between the driven shaft upon which the unimount drive unit is directly mounted and the base fastening at the foundation upon which the self-aligning support is supported. In installing power transmission drives utilizing this virtually self-supported unimount drive unit rigidly coupled directly on the driven shaft of the driven machinery and the unimount drive unit support rigidly coupled to a foundation or support, the misalignment between the two rigidly coupled connections is of no particular concern, even though the misalignment present in a given application may be of considerable degree. In this instance, the misalignment is limited only by the amount of movement provided by the difference between the opening in the side of the caps through which the shank of the studs extends and the size of the stud shank. Thus, the unimount drive unit may be mounted directly about a driven shaft of which the axis is deformed or, of which the support bearings are worn or out of line or other misalignment conditions ordinarily encountered in transmission drive applications, while the base 61, is rigidly attached to a foundation having entirely different angularity. In all cases, the drive is protected against undue abuse and wear without resorting to a flexible drive coupling between the two shafts being coupled.

To accommodate situations requiring a shorter counterpoise spring, one end of the counterpoise spring could seat on the face of the cross bar, instead of passing therethrough. This then would allow for an extension of the shank of the stud 54 as desired independent of the length of the counterpoise spring.

The primary drive 12, as shown is formed of a V grooved pulley 62, attached to the motor output shaft 14, and attached to the speed change device input shaft 15, is a driven V groove pulley 63, and about and therebetween are V belts 64. All of these parts forming the primary drive, are readily obtainable and, form together with the changeability of the spacing between the two shafts 14 and 15, a convenient system for varying the driven speed of the gear unit with the desired consequent change in the speed of the slow speed power takeoff conforming to the speed of the driven shaft, without having to change the gearing of the speed change device or the speed of the driving electric motor. To change the drive ratio of the primary drive, at least one of the pulleys is substituted by a pulley having different effective diameter, and this effects change in the pitch length about and therebetween the pulley structures connected by the V belt, and to compensate for such change, requires change of the center distance between the two pulleys, even though V belts of different lengths are used to cover the desired range permissible at the power takeoff of the unimount drive unit, as standard V belts are considered as being endless and the difference between different belts is considerable.

In primary drives of the type specified, they effect a driving pull that tends to draw the two shafts toward one another, all of which is, in this development, compensated for by the mounting plate 13, therefore the overhung situation of the primary drive about the driven shaft 9, or its support, is acounted for independently of the driven shaft of the driven machinery.

Outline of a guard about the primary drive is indicated by the numeral 65, and this guard comprises optional structure that may be supported by extensions (not shown) from the mounting plate.

The unimount drive unit application, shown in the Figures 5 and 6, includes that hereinabove described, with the exceptions, that the self-aligning support 16 has been removed (the hole in the mounting plate 13, about which the caps 48 and 49 are assembled onto the mounting plate are generally indicated by the numeral 16'), and the drive arrangement is considered vertical, being supportably mounted about the universal mounting hub 43 onto the angle member 67. The angle member is to be considered as a portion of the driven machinery and, may be of other form. Its purpose is to serve as a foundation for the unimount drive unit. In this drive arrangement, another change is shown and comprises only an assembly change. The change resides in that the speed change device 11 is turned ninety degrees about the center of the universal mounting hub, which in this instance is in line with the power input shaft and power takeoff. This change is ordinarily provided for by the distribution of the mounting screws or bolts 13A, and conveniently provides that the gear 33, see Figure 1, will extend into oil usually contained in the gear housing.

Referring to Figures 5 and 6, the drive shaft of the driven machinery, is indicated by the numeral 9' and in this instance, the unimount drive unit is supported about the universal mounting hub, which is supported on a foundation that may be considered as a portion of the driven machinery. Therefore, the manner in which the portion of the drive shaft is joined to the power takeoff may be considered as affording a support for this portion of the drive shaft, and therefore obviating the necessity of a support bearing such as is indicated by the numeral 66 in the Figure 1, heretofore considered.

The universal mounting hub is shown provided with a groove 68 (see Figure 1) and in the arrangement of Figures 5 and 6, a U bolt 69 is shown and together with securing nuts, the U bolt extending about a portion of the groove and through apertures formed in the angle member 67, forms a connection between the two. The mounting arrangement affords wide range for difference of the angularity between that of the axis of the driven shaft 9' and the alignment of the foundation supporting the universal mounting hub.

The permissible angularity of drive arrangements, is not restricted to that of the horizontal and vertical arrangements heretofore described, for the device affords drive angularities wherein the motor may be positioned anywhere about the arc 70 of Figures 2, 5, 7 and 9. This arc 70 is scribed from the center of the slow speed power takeoff in each instance.

Referring to the Figures 7 and 8, the modified arrangement of the unimount drive unit shown, is essentially identical with that hereinabove described. The different arrangement shows the primary drive located on the same side as that of the slow speed power takeoff and to afford compactness, the arrangement of the gearing, shown by dotted lines within the gear housing, is arranged in different manner than that of the device shown in the Figures 1 and 2. Also in the interest of compactness the stud 47 (Figure 1) in this illustration has only a single shank, all of which does not alter flexibility of the ball type joint or its purpose.

Figure 9:
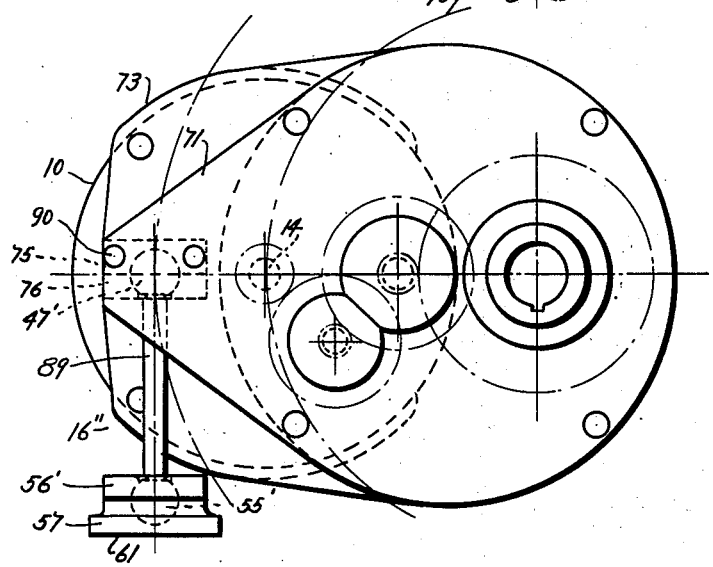
Figure 9 is an elevation taken on the power takeoff side similar to that of Figure 2, but the primary drive being eliminated in this modified drive.

Referring to the Figures 9 and 10, which disclose a modified form of the unimount drive unit, this embodiment is essentially identical with that hereinabove described, with the following exceptions:

(1) In this instance, the speed change unit, generally indicated by the numeral 11', is a triple reduction gear unit, the gearing, shafts and their bearings are generally indicated within a three part gear housing by dotted lines in Figure 10, while at the Figure 9, these gears are indicated by the dash and dot circles. This device does not include a primary drive. The addition of the third gear reduction affords a similar motor speed reduction at the low speed power takeoff, as though a primary drive were provided.

(2) The self-aligning support generally indicated by the numeral 16'', and forming a support at a position that more nearly coincides with the center of the weight, does not include the counterpoise. The inclusion of a counterpoise as hereinabove described, is optional, depending upon the position of the self-aligning support relative to the overhung situation, and its relationship to that of the power takeoff.

(3) The slow speed power takeoff of the speed change unit 11', affords for the driven shaft 9'' of the to be driven machinery entering therethrough if it is so desired in the application of this device.

(4) A universal mounting hub 43' is provided at each side of the gear housing, either one or both may be utilized as desired and in such event, the necessity of the support bearing 66' is optional.

The motor 10 is similar to that hereinabove described, and in this instance the mounting flange and the power input shaft 14 extension are on the same end. The speed change unit 11' includes a gear housing that is formed of three parts and they form together with other detail parts an oil tight enclosure for a desired gearing. This housing includes a rear section 71, a midsection 72, and a forward section 73, all fitted and fastened together in ordinary manner to form a single unit (the fastenings are not shown). The forward section 73 has an extension 74 that is partly open at the sides to form an opening for interior ventilation of the motor. The end of this extension is formed to afford a rigid mounting for the mounting flange of the motor, and spaced from the extension 74, is another extension forming one of the two universal mounting hubs 43' (similar to that of the hub 43, Figure 1). The rear section 71, is similar to that of the forward section 73, but is without the extension 74. Both the forward and the rear sections are provided with means to support the bearings journaling the shafts and the power takeoff, and are provided with means for attaching thereto and between the caps 75 and 76 of the self-aligning support 16''. Thus, both the forward and the rear sections 71 and 73 together with the midsection 72 therebetween forms a support for the motor, gear shafts and power takeoff bearings, universal mounting hubs and/or the self-aligning support 16''.

Referring to Figure 10, on the motor output shaft 14, which may also be considered as being the input shaft of the speed change unit 11', is mounted a pinion gear 75', in mesh with a gear 76' mounted on a shaft 77, which is journaled in the bearings 78. On the shaft 77 is mounted a pinion gear 79, in mesh with a gear 80 mounted on a shaft 81, which is journaled by the two bearings 82. On the shaft 82 is mounted a slow speed pinion gear 83 meshing with a slow speed gear 84 mounted on power takeoff 85. The takeoff 85 is journaled in the roller bearings 86, and the bearings 86 are collared on the power takeoff by the end collars 87. The collars 87 may be provided with setscrews (not shown) passing through the power takeoff wall for anchoring the collars to the power takeoff and the device on the driven shaft 9''. The power takeoff is bored and keyseated to receive the shaft 9'', or bushing.

The self-aligning support 16'' is formed of the caps 75 and 76, Figure 9, and screws 88 are provided fastening them together (see Figure 10). The caps 75 and 76 have a portion of their interior surfaces bearing on the spherical end 47' of a strut 89 to form a ball type joint. The caps 75 and 76 have opposite sides attached to the rear and forward sections 71 and 73 by screws 90 and form a fixed part of the speed change unit 11'. Optionally, in place of the ball type joint, a pin type joint could be substituted, or throughout the various illustrations described, to obtain flexibility between the unit and the support member possessing a resilient property and with pin or bolt could be substituted for the supports indicated. The opposite end of the strut 89, is provided with a similar spherical end portion 55' and about this spherical end portion is a cap 56' and a base cap 57, having interior surfaces that bear upon the spherical end portion to form a ball type joint. The caps 56' and 76 have in one of their sides, an enlarged hole to afford a passage therethrough for the shank of the strut. The flexibility and purpose of these ball type joints are as hereinabove described.

In this instance, in Figures 9 and 10, the unimount drive unit is indicated as coupled directly onto the driven shaft 9'' and the arrangement of the drive is considered as horizontal. However, as hereinabove described, other drive angularities are permissible, and the plane of the axis of the drive shaft of the machinery to be driven may be horizontal or otherwise, or edge of the mounting member, can be made to rest upon the floor or shelf surface to form supportability with flexibility, for an application of the various devices indicated. Obviously, in all cases, the base could be supported from above and when counterpoise spring is employed, its direction is reversed.

The following description is devoted to a consideration of but a few potential alignment problems which may arise involving the relationship between the axis of the drive shaft of the driven machinery on which the power takeoff shaft of the unimount drive is directly mounted and the unimount drive unit development including as an integral part thereof the flexible mounting characteristics heretofore described.

Referring to Figure 1 of the drawings, the longitudinal axis of the driven shaft 9 and stud 46 are shown as being parallel to one another, and in Figure 3, the base 61 of cap 57 is shown as being parallel to the longitudinal axis of stud 46. Therefore, assuming that the power takeoff shaft 38 is rigidly coupled to the drive shaft 9 of driven machinery and that base 61 is affixed to a rigid foundation which may be considered as a part of the driven machinery or as an entirely different structure, all of the aforesaid elements are parallel and aligned.

However, were the face of the foundation to which base 61 is attached other than parallel to that of the longitudinal axis of stud 46 or the driven shaft 9, such a circumstance clearly produces a parallel mounting misalignment. To illustrate such a condition, let it be assumed that the foundation face be sloped so that when base 61 is attached to the sloping face of the foundation, the enclosing structures around the spherical end portion 55 (heretofore described), automatically swivels about the spherical end portion to assume a position such as indicated by the dotted line outline shown in Figure 3. Thus, it is readily seen that the parallel misalignment problem is easily met and compensated for in a practical manner, and without upsetting the functions of the unimount drive unit or having to resort to time consuming alignment between the foundation and the base of the unimount drive unit. Since, as has been pointed out before, the seating ends of spring 60 of the reactance device are adjustable, the force exerted by the reactance device may be adjusted to compensate for the force exerted by the weight of the overhanging portion of the unit about the flexible support.

As a further example of parallel misalignment, let it be assumed that the center line 8 (see Figure 3), represents the longitudinal axis of the driven shaft 9, and that the enclosure structures about the spherical end portion remain in the position shown by the solid lines. When viewed in plan in Figure 1, the longitudinal axis of both the driven shaft 9 and the stud 46 will appear to be parallel to one another, and under such conditions, the mounting plate 13 and the attachments thereof would swivel about portion 47 of stud 46, assuming the dotted line position of plate 13 and its associated elements shown in Figure 3. This would automatically occur without upsetting the function of the unimount drive unit or its self-aligning support. Hence, it is clearly seen that the universal flexibility of the self-aligning support readily provides adjustment to accommodate either parallel or angular mis-alignment situations, or combinations of the two.

As an example of angular alignment situations, reference is again made to Figure 1. Let it be assumed that the power takeoff shaft 38 is rigidly secured on the driven shaft 9, and that the base 61 is attached to a rigid foundation. The longitudinal axis of the driven shaft 9 and stud 46 are shown parallel to one another and two sides of the dotted square 61', representing the base 61, are shown parallel to that of the longitudinal axis of the stud 46. Under such circumstances, the aforesaid elements are all in angular alignment. Now, however, to illustrate an example of angular misalignment, assume that base 61 as represented by the dotted square 61' must be maintained in the position shown, but that the direction of the longitudinal axis of the driven shaft 9 be as represented by the line 8', and let line 7 represent the consequent direction of the mounting plate 13. The axis of the power output shaft 14 will then fall on line 6. From the foregoing description it is clear that a condition of angular misalignment has been established between the longitudinal axis of the driven shaft 9 and the direction of the base.

The self-aligning support automatically solves this assumed misalignment problem without upsetting the unimount drive unit, for as described above, adjustment of the assembled structure is readily effected about the spherical portion 47, or it could be effected about the spherical portion 55. In the latter case, the point numerated 5 becomes the center of spring 60 at its upper end, while the center of this spring is maintained at the projection of cap 56, without interfering with the function of the reactance device.

As a further example of angular misalignment, reference is made to Figure 2. Here base 61 is shown as being parallel to the horizontal line connecting the center of the input shaft 15, which is also in this case the center of the power takeoff shaft 38, with the center of the power output shaft 14, all of which may be considered as being in angular alignment. However, were the face of the foundation to which is attached base 61 be other than parallel to the horizontal line, a problem of angular misalignment would be presented.

By way of illustration, let it be assumed that the face of the foundation be on a slope so that upon attaching the base 61, the enclosure structure about the spherical end portion 55 swivels about the spherical end portion to assume a position such as is indicated by the dotted lines. The elements under these conditions disclose an angular misalignment between the horizontal line and the base. The development provides that the enclosure structure may swivel about the spherical end portion in any direction, and therefore automatically solves misalignment problems.

Let it be further assumed that the center of the power takeoff shaft 38, or the center of the driven shaft 9 be a fixed point, a line from this center connecting the location of the motor 10 need not be horizontal for, as has been heretofore discussed, the motor may be positioned anywhere on arc 70, the whole unit swinging about the fixed center. It is apparent that the base need not necessarily be parallel to the line connecting the center of the power takeoff shaft 38 and the center of the motor. Obviously, the described unit permits great latitude of angular alignment adjustments as the adjustments automatically occur at one or both of the spherical portions.

The alignement conditions set forth above may be frequently encountered in original installations, and the flexible mounting characteristics of the base of the unimount drive unit prove the feasibility and practicality of employing a mounting of this design, and further, the installation savings are obvious to those skilled in the art.

The inherent flexibility characteristics of this support base become invaluable in meeting and solving misalignment problems which arise during the course of operation. These uncontrollable factors are usually encountered during the application of directly connected speed change devices, the expansion and contraction resulting from temperature changes, vibration, settling of foundations, journal wear, driven shaft flexing, and many others, all of which result in misalignments for which the present self-aligning support makes automatic and practical compensation.

I claim:

1. A counterpoise comprising a base having a stud universally mounted therein, support means mounted on said stud, a second stud mounted on said support means, means universally connecting with said second stud a structure whose force is to be counteracted, and resilient means engaging said base and said structure and constantly exerting a force in a direction opposite to said first-named force.

2. A counterpoise comprising a base having a stud universally mounted therein, a bracket mounted on sadi stud, a second stud mounted on said bracket, means universally connecting with said second stud a structure whose force is to be counterbalanced, and adjustable counterbalancing means effecting a force on said structure in opposition to said first force.

3. A counter poise comprising a base having a stud universally mounted therein, a substantially L-shaped bracket mounted on said stud, a second stud mounted on one of the arms of said bracket, means universally connecting with said second stud a structure whose force is to be counterbalanced, and adjustable counterbalancing means effecting a force on said structure in opposition to said first force, said last named means comprising a resilient element.

4. A counterpoise comprising a base having a stud universally mounted therein, a substantially L-shaped bracket mounted on said stud, a second stud mounted on one of the arms of said bracket, means universally connecting with said second stud a structure whose force is to be counterbalanced, and adjustable counterbalancing means effecting a force on said structure in opposition to said first force, said last named means comprising a helical spring, said helical spring having one of its ends engaging said base while the other end thereof engages against said structure.

5. A counterpoise comprising a base having a stud universally mounted therein, a substantially L-shaped bracket mounted on said stud, a second stud mounted on one of the arms of said bracket, means universally connecting said second stud with a structure whose force is to be counterbalanced, said structure including a cantilever, counterbalancing means comprising a helical spring, one end of said spring engaging against one end of said cantilever while the other end of said spring abuts against said base.

6. A counterpoise comprising a base having a stud universally mounted therein, an L-shaped bracket mounted on said stud, an open ended cylindrical guard sleeve mounted on the base of said L-shaped bracket, a second stud mounted between the arm of said L-shaped bracket and said cylindrical guard sleeve, means universally connecting said second stud with a structure whose force is to be counterbalanced, said structure including a cantilever having a free arm extending over one end of said cylindrical guard sleeve, a helical counterbalancing spring disposed within said cylindrical guard sleeve and having one of its ends projecting through one of said open ends of said cylindrical guard sleeve and engaging against said free arm of said cantilever, the other end of said spring extending through the other of said openings and abutting against said base.

7. A counterpoise as defined in claim 6, and means mounted on said free arm of sadi cantilever for adjusting the degree of compression of said spring.

8. A counterpoise comprising a base having a stud universally mounted therein, an L-shaped bracket mounted on said stud, an open-ended cylindrical guard sleeve mounted on the base of said L-shaped bracket, a second stud mounted between the arm of said L-shaped bracket and said cylindrical guard sleeve, means universally connecting said second stud with a structure whose force is to be counterbalanced, said structure including a cantilever having a free arm, said free arm having a transverse threaded aperture formed adjacent one end thereof, a set screw mounted in said threaded aperture and having an enlarged end portion, said enlarged end portion being positioned adjacent one of said open ends of said cylindrical guard sleeve, a helical spring disposed within said cylindrical guard sleeve and projecting beyond each of said open ends, one end of said spring engaging against said enlarged end portion, the other end of said spring abutting against said base, and locking means securing said set screw in any given adjusted position.

9. In a variable speed transmission having a common mounting member, a self-aligning flexible support comprising, a base member, a bracket universally supported on said base member, a horizontal support universally supported from said bracket and provided with means for supportably connecting said bracket with said common mounting member of the transmission, and a coiled spring in resilient abutment between said base member and said horizontal support.

10. In combination, a prime mover having a power output shaft supported for rotation, a driver member mounted on said output shaft, a speed change device including a power input shaft and a power takeoff shaft supported for rotation, said power takeoff shaft including a mounting element, transmission drive means connecting said power input shaft and said power takeoff shaft, a driven member mounted on said power input shaft, a common mounting member, the longitudinal axis of said common mounting member extending in direction perpendicular to the longitudinal axis of said power takeoff shaft, means on said common mounting member for rigid attachment of said prime mover and said speed change device thereto in spaced parallel alignment to one another to form a rigid unit, an endless flexible driving element connecting said driver member and driven member to transmit power from said prime mover to said speed change device, a self-aligning flexible support comprising, a base member, a bracket universally supported on said base member, a coupling means, said coupling means interconnectingly coupling said bracket and said common mounting member so as to permit of universal movement between said common mounting member and said base member, the axes of said self-aligning support being disposed apart from the longitudinal axis of said power takeoff shaft, and means on said mounting element for a direct drive connection and a rigid couple between said power takeoff shaft and a drive shaft of machinery to be driven.

11. In combination, a prime mover and a speed change device operably coupled to form a rigidly coupled speed change unit, said unit having a power takeoff including means for connecting it rigidly about a portion of a drive shaft of machinery to be driven, a support for said unit, said support having a base adapted to be secured to a foundation and universally flexible coupling means interconnecting said base and said unit in which the axes of said coupling means are spaced from the longitudinal axis of said power takeoff.

12. In combination, a prime mover having a power output shaft, a speed change device comprising, a common mounting means, a power takeoff shaft, bearing supports for said power takeoff shaft supportably mounted by said common mounting means, transmission drive means interconnecting said power output shaft and said power takeoff shaft so that said power output shaft forms a power input shaft of said speed change device, the long axis of said common mounting means extending in direction perpendicular to the longitudinal axis of said power takeoff shaft, and said common mounting means including means for rigid attachment thereto of said prime mover in spaced parallel alignment to said power takeoff shaft to form, a rigid unit, a self-aligning flexible support comprising, a base member, said base member having a base adapted to be secured to a foundation, an extension universally supported on said base member, universal support element including coupling means for supportably connecting said extension with said common mounting means, the axes of said self-aligning support being disposed apart from the longitudinal axis of said power takeoff shaft, said power takeoff shaft including a mounting element, and said mounting element providing for a direct drive connection and a rigid couple between said power takeoff shaft and a drive shaft of machinery to be driven so that said self-aligning flexible support automatically compensates for misalignment, parallel and angular, between said power takeoff shaft and said base.

13. In combination with the drive shaft of machinery to be driven, a speed change transmission including, a prime mover, and a common mounting member, said prime mover rigidly supported on said common mounting member, said prime mover having a power output shaft supported for rotation, said speed change transmission having power input and power takeoff shafts, bearing supports for said power input and power takeoff shafts supportably mounted by said common mounting member in spaced parallel relationship to the longitudinal axis of said power output shaft, the long axis of said common mounting member extending in a direction transverse to the longitudinal axis of said power takeoff shaft, a self-aligning flexible support comprising, a base member adapted to be secured to a foundation, a bracket universally supported on said base member, universal support element including coupling means for supportably connecting said bracket with said common mounting member of the speed change transmission, the axes of said self-aligning flexible support being disposed apart from the axis of said power takeoff shaft, said power takeoff shaft being provided with a mounting element, said mounting element providing for rigid couple between said power takeoff shaft and said drive shaft, and said mounting element of said power takeoff shaft together with said rigid couple in combination with said base member of said self-aligning flexible support forming an installing couple for said speed change transmission between said drive shaft and said foundation.

JOHN D. RIESER.

References Cited in the file of this patent

UNITED STATES PATENTS

| Number | Name | Date |
|---|---|---|
| 2,005,122 | Young et al. | June 18, 1935 |
| 2,040,035 | Trott | May 5, 1936 |
| 2,328,518 | Wahlberg | Aug. 31, 1943 |
| 2,346,731 | Collins | Apr. 18, 1944 |